April 16, 1968 — W. H. CROMLEY — 3,378,675

MOTOR ACTIVITY INDICATOR

Filed Sept. 1, 1964 — 3 Sheets-Sheet 1

INVENTOR.
WILLIAM H. CROMLEY
BY
ATTORNEYS

April 16, 1968     W. H. CROMLEY     3,378,675

MOTOR ACTIVITY INDICATOR

Filed Sept. 1, 1964     3 Sheets-Sheet 2

INVENTOR.
WILLIAM H. CROMLEY
BY

ATTORNEYS

April 16, 1968     W. H. CROMLEY     3,378,675
MOTOR ACTIVITY INDICATOR

Filed Sept. 1, 1964     3 Sheets-Sheet 3

*INVENTOR.*
WILLIAM H. CROMLEY
BY
ATTORNEYS

United States Patent Office 3,378,675
Patented Apr. 16, 1968

3,378,675
MOTOR ACTIVITY INDICATOR
William H. Cromley, Springfield, Pa., assignor to Smith Kline & French Laboratories, Philadelphia, Pa., a corporation of Pennsylvania
Filed Sept. 1, 1964, Ser. No. 393,504
4 Claims. (Cl. 235—92)

ABSTRACT OF THE DISCLOSURE

An apparatus for indicating the degree of activity of laboratory animals comprises an illuminated platform and a lens for projecting the image of an animal on the platform onto an array of photocells, electrically connected in parallel. A differentiator provides an output whenever a change occurs in the number of photocells covered by the image of the animal. A counter receives the output of the differentiator and counts the number of such changes.

---

This invention relates to motor activity indicators, and particularly to indicators employing photo-sensitive devices for indicating the degree of activity of laboratory test animals.

Motor activity indicators have particular utility in the testing of drugs, wherein a comparison is to be made between the activity of an animal to which a drug has been administered and the normal activity of a similar animal. An indication of the stimulating or tranquilizing effects of various drugs can be obtained by the use of such devices.

Devices of this type have further utility in psychological studies wherein the response of an animal to various test stimuli, for example, electrical shocks, is to be indicated.

In my U.S. Patent 3,063,630, issued Nov. 13, 1962, there is disclosed a motor activity indicator employing a platform, the movement of which by a test animal is indicated through an electromagnetic means providing impulses to operate a counter. In devices of this type, it is necessary for the test animal to overcome mechanical inertia of the platform before its movement can be detected. Thus, the sensitivity of the device to small degrees of movement is limited. Furthermore, there is the possibility that motion of the platform will affect the motor activity of the test animal and thereby add an unknown factor to decrease the accuracy of measurement.

It is therefore an object of this invention to provide a motor activity indicator having high sensitivity and accuracy, and having as few disturbing or distracting effects as possible.

A further object of the present invention is to provide a motor activity indicator employing photo-sensitive devices, which provides a large area for the movement of a test animal and which is capable of detecting small movements at any point in this area.

These and other objects of the invention will become apparent from the following description when read in conjunction with the accompanying drawings, in which.

Figure 1:
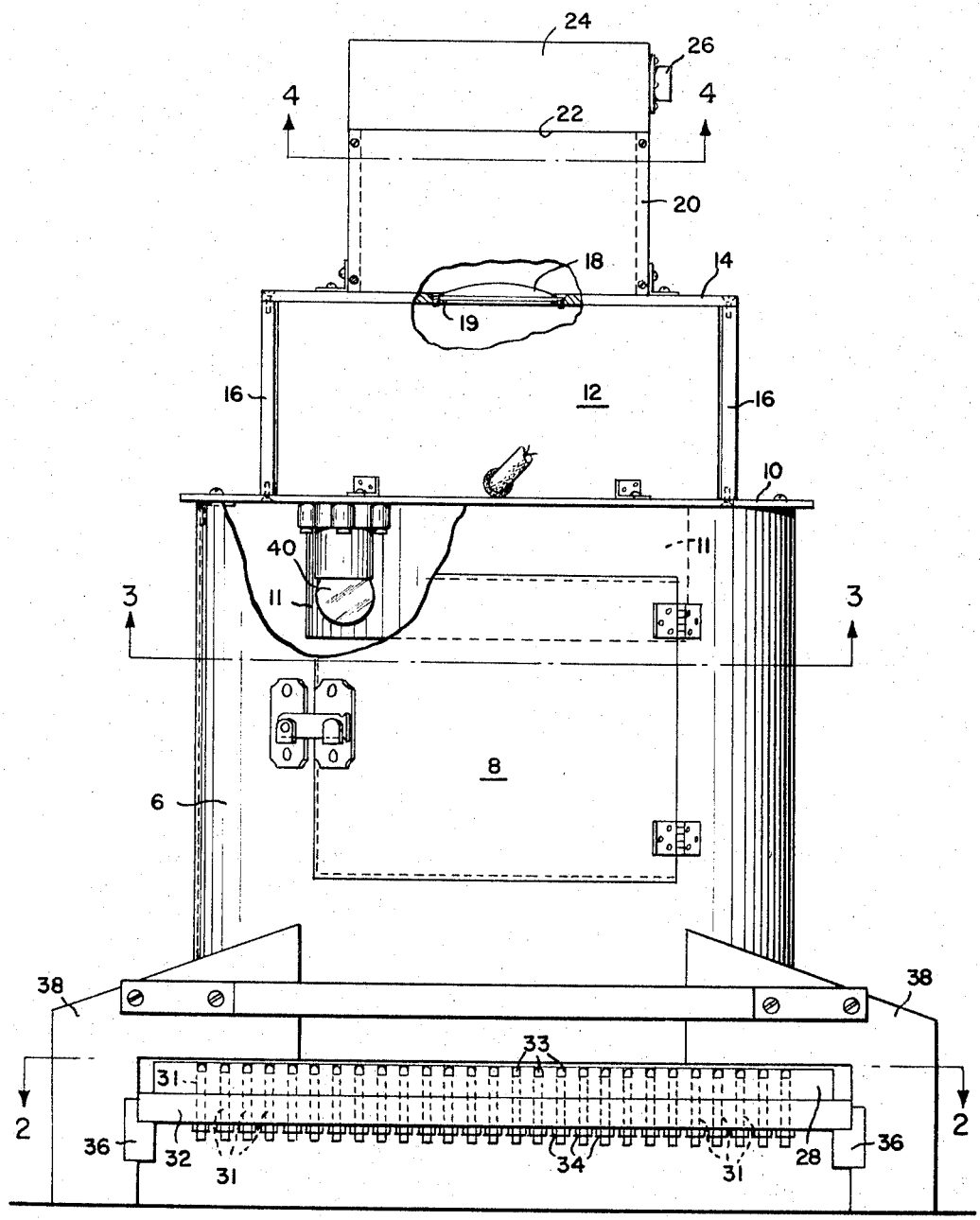
FIGURE 1 is a partially cut-away elevation of an activity-detecting apparatus of the present invention.

Referring to FIGURE 1, there is shown a metal cylinder 6 provided with a hinged and latched door 8. At the top of cylinder 6 there is fixed by means of brackets, a flat, ring-shaped member 10, integral with a cylindrical baffle 11. A second cylindrical member 12 is fastened above member 10 by means of brackets, and is partially closed at its top by a ring-shaped member 14, fastened, by means of rods 16, to member 10. A plano-convex lens 18 is held against flange 19 of member 14 by means of screws.

A rectangular enclosure 20 is mounted above member 14 by means of brackets, and is closed at its top by surface 22. An enclosure 24 is provided for photo-sensitive detectors which will be described, and an opening 26 is provided for connection of these detectors to external circuitry.

Figure 2:
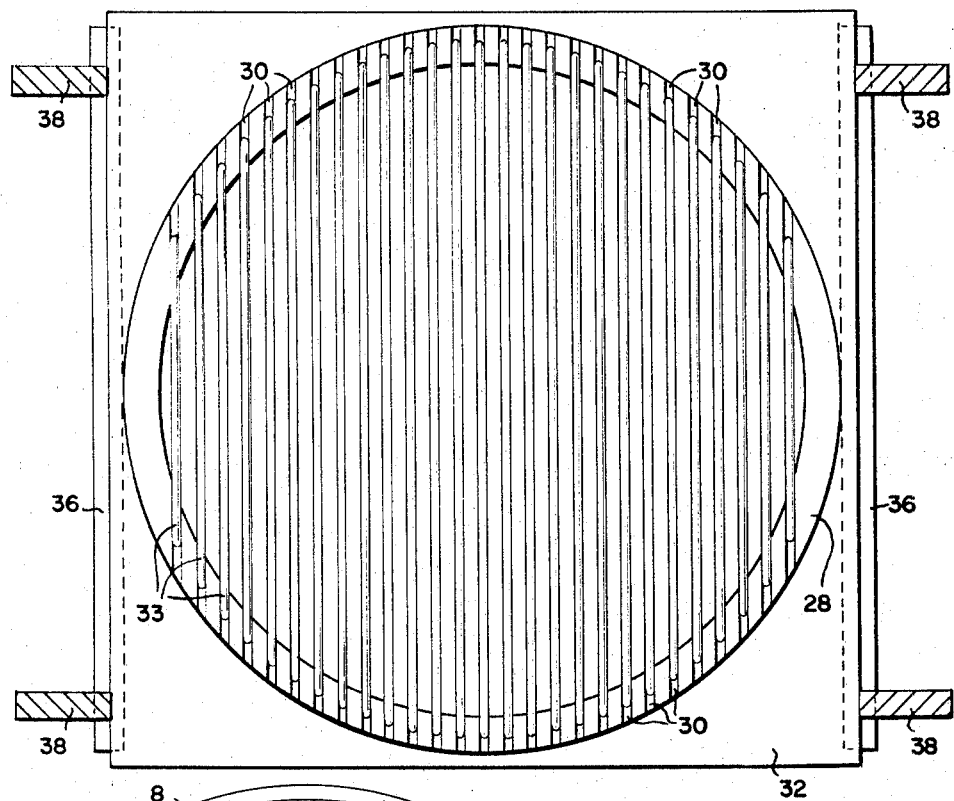
FIGURE 2 is a sectional view taken on the trace 2—2 of FIGURE 1, showing the rod platform at the bottom of the animal chamber.

Referring to FIGURES 1 and 2, there is shown a platform grid comprising a circular member 28 having a plurality of parallel, horizontal grooves 30 and a hole 31 ending in each groove and extending through member 28 vertically. Member 28, which is desirably formed of an electrically insulating material, is fastened to a rectangular member 32, having a large hole in its center. A number of rods 33 are adapted to extend, in parallel arrangement, across member 28 and between opposite grooves 30. The ends of each of these rods are bent to extend vertically through holes 31, and are threaded and secured to member 32 by means of nuts 34.

The entire platform assembly is adapted to slide on runners 36, which are fixed to base members 38. The platform assembly is thus made interchangeable, and various other platform assemblies can be substituted, the choice being primarily dependent on the size of animal to be tested.

Figure 3:
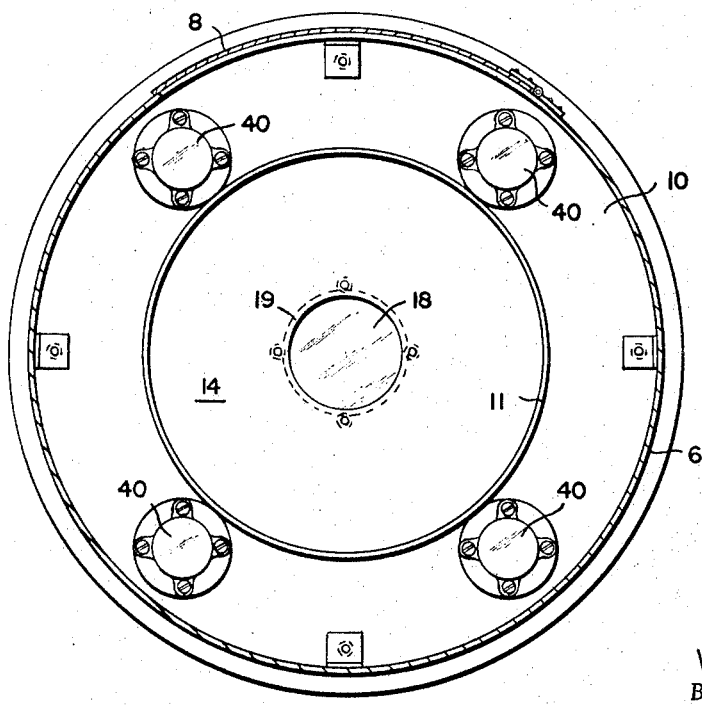
FIGURE 3 is a sectional view taken on the trace 3—3 of FIGURE 1, showing the lighting arrangement and the projection lens on the roof of the animal chamber of the present invention.

Referring to FIGURES 1 and 3, member 10 is shown, below which are mounted a number of lights 40 to illuminate the platform assembly. Baffle 11 prevents light from lights 40 from striking lens 18 directly.

Figure 4:
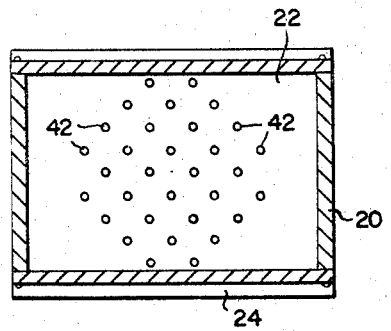
FIGURE 4 is a sectional view taken on the trace 4—4 of FIGURE 1, showing the projection screen, and illustrating the arrangement of the photo-sensitive detectors in accordance with the present invention.

Referring to FIGURE 4, projection surface 22 is shown provided with a number of holes 42 arranged in a symmetrical pattern. The relative positions of surface 22, lens 18 and rods 33 are such that the assembly shown in FIGURE 1 constitutes an optical projection system in which the image of an animal standing on the platform comprising rods 33, is projected by means of lens 18 onto the surface 22. Holes 42 in surface 22 are distributed so that they cover the image of the entire platform evenly. That is, the area of the platform is divided into a number of equal segments, each of which corresponds to a hole on the projection surface 22. The object of this arrangement of holes is to provide for a response in the accompanying electrical circuitry which is independent of the position of the test animal.

Figure 5:
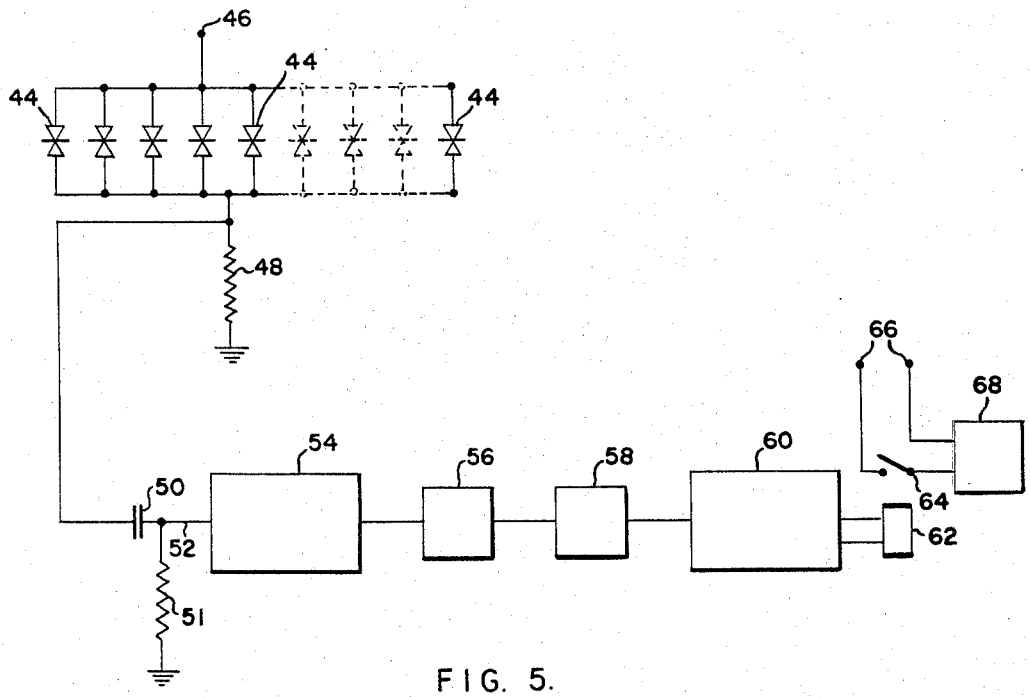
FIGURE 5 is a schematic diagram showing the electrical circuitry in accordance with the present invention.

Referring to FIGURES 4 and 5, a silicon photo-diode 44 is mounted behind each hole 42 to respond to the light passing through its corresponding hole. Each of these photo-diodes 44 has a resistance between its terminals which decreases from a relatively high value to a relatively low value as the intensity of incident light increases. It will be apparent that various other photo-sensitive devices having these same general characteristics can be used in place of silicon photo-diodes to obtain equivalent results. All of these photo-diodes 44 are connected in parallel. A direct current voltage is supplied between terminal 46 and ground, and an output is taken across resistor 48. A differentiating circuit, comprising capacitor 50 and resistor 51, is provided to differentiate the signal appearing across resistor 48. Thus, a signal appears in line 52 only when the voltage across resistor 48 is changing. The signal in line 52 is fed to a two-stage capacitance-coupled amplifier 54 and thence to a rectifying circuit 56 which passes only positive pulses. A limiting circuit 58 is provided to chop off parts of pulses appearing at the output of rectifying circuit 56, which exceed a predetermined value. The output of limiter 58 is fed to a trigger circuit 60, which is designed to actuate relay coil 62 each time it receives a pulse from limiter 58. Actuation of coil 62 results in closure of contacts 64 which delivers power from terminals 66 to an electro-mechanical counter 68.

In operation, an animal, which is preferably white or light in color, is placed on the grid comprising rods 33. The test animal should be of such a size that the length of its image on surface 22 is at least of the order of the distance between two adjacent holes 42. This minimum size is based on the fact that smaller animals are capable of considerable undetected activity such that their images move in the diagonal paths between rows of photo-diodes. Animals of considerably larger dimensions can be used as well. Lightly colored test animals are preferred, since they are better reflectors of light and their image on surface 22 will be brighter than that of a dark animal.

The effect of light reflected from rods 33 is of minor consequence since it is of a constant nature and since photo-diodes 44 are only activated by it to a small extent compared with the extent to which they are activated by the image of an animal. Black colored rods can be used to obtain optimum sensitivity.

It has been found that white lights tend to distract some tests animals, and consequently, other colors of lights are to be preferred. Red lights, for example, have been found to be satisfactory from this standpoint.

Considering a mouse of such a size that his image on surface 22 may cover one, two or none of holes 42. His movements will cause fluctuations of voltage across resistor 48, and these fluctuations will be between three levels. If the mouse's image initially covers one hole, and he moves so that his image covers two holes, the voltage across resistor 48 will increase from a medium level to a higher level. The differentiating circuit, then, delivers a positive pulse to line 52. On the other hand, if the mouse moves so that his image covers none of holes 42, the differentiating circuit delivers a negative pulse to line 52. The coupling capacitor between the stages of amplifier 54 differentiates the output of the first amplifying stage, and thus, the output of amplifier 54 consists of a positive pulse following a negative puse for one case, and a negative pulse following a positive pulse for the other case. Consequently, the circuit responds in an equivalent manner both to movements resulting in voltage increase and to movements resulting in decrease of voltage across resistor 48.

The output of limiter 58 consists of positive pulses, each of which corresponds to a change of voltage across resistor 48 without regard to the direction of the change. Counter 68 responds to each of these pulses.

It will be apparent that the movements of a larger animal, whose image covers several photo-diodes at one time, will result in smaller changes in voltage across resistor 48 than would result from the movement of a smaller animal. Because of high amplification of amplifier 54, larger animals can be tested without making any modifications to the apparatus.

In the testing of drugs, a number of animals of standard size, age and coloration are ordinarily used for purposes of comparison. Results are obtained by recording the number of counts produced by an animal's movements in a given length of time. The length of time required is ordinarily of the order of 5-30 minutes, this time depending on the desired significance of the results.

The sensitivity of the measuring circuit can be varied by adjusting the amplification of amplifier 54.

Returning to the mechanical design of the apparatus, chamber 6 is made cylindrical for the reason that some test animals have a tendency to hide in corners of enclosures. Chamber 6 being cylindrical, no distraction or error in measurement results from this tendency.

Platform grid assembly 28 is made removable for purposes of sanitation. In addition, it is sometimes desirable to substitute platforms of different grid configurations or of different rod spacings, depending on the nature or the size of the test animal.

The platform assembly shown in FIGURE 2, is adaptable for use in tests wherein the response of an animal to an electrical stimulus is desired to be measured. Alternate rods 33 can easily be supplied with different potentials by connecting supply leads to the portions of rods 33 extending below member 32.

It will be apparent that various modifications can be made to the apparatus of the present invention without departing from the scope of the invention as defined by the following claims.

What is claimed is:

1. A motor activity indicator comprising means defining an area for movement of a test animal, means projecting an image of said animal, a plurality of photo-sensitive electrical devices connected in parallel and arranged to be actuated selectively by said image, means differentiating the electrical output of said photo-sensitive devices, and electrical counting means responsive to the output of said differentiating means.

2. A motor activity indicator comprising means defining an area for movement of a test animal, means projecting an image of said animal, a plurality of photo-sensitive electrical devices connected in parallel and arranged to be actuated selectively by said image, means differentiating the electrical output of said photo-sensitive devices, means amplifying the output of said differentiating means, and electrical counting means responsive to the output of said amplifying means.

3. A motor activity indicator comprising means defining an area for movement of a test animal, means projecting an image of said animal, a plurality of photo-sensitive electrical devices connected to parallel and arranged to be actuated selectively by said image, a first differentiating means receiving the output of said photo-sensitive devices and providing an output proportional to the rate of change of said output of said photo-sensitive devices, means amplifying the ouptut of said first differentiating means, a second differentiating means receiving the output of said amplifying means, a second amplifying means receiving the output of said second differentiating means, means rectifying the output of said second amplifying means, and electrical counting means responsive to pulses appearing at the output of said rectifying means.

4. A motor activity indicator comprising a platform for movement of a test animal, a cylindrical enclosure above said platform defining a circular area on said platform for movement of said animal, lighting means within said enclosure illuminating said platform, a leans arranged to project the image of said animal, shielding means preventing light from said lighting means from directly illuminating said lens, a plurality of photo-sensitive electrical devices arranged to be actuated selectively by said image, and counting means responsive to changes in the number of said photo-sensitive devices being actuated by said image.

References Cited
UNITED STATES PATENTS 2,412,822   12/1946   Malter _____ 250—221 X
3,040,980   6/1962   Mann _____ 250—221 X
3,063,630   11/1962   Cromley _____ 235—92

MAYNARD R. WILBUR, *Primary Examiner.*

DARYL W. COOK, *Examiner.*

G. J. MAIER, *Assistant Examiner.*